United States Patent [19]

Shikano

[11] Patent Number: 5,568,341
[45] Date of Patent: Oct. 22, 1996

[54] MAGNETIC DISK DRIVE SEALING STRUCTURE HAVING A SOFT ELASTIC MEMBER BONDED TO A CORE MEMBER

[75] Inventor: Kazunori Shikano, Higashine, Japan

[73] Assignee: Fujitsu Limited, Japan

[21] Appl. No.: 332,352

[22] Filed: Oct. 31, 1994

[30] Foreign Application Priority Data

Jan. 20, 1994 [JP] Japan .................................. 6-004332

[51] Int. Cl.⁶ .................................................. G11B 33/14
[52] U.S. Cl. ........................................................ 360/97.02
[58] Field of Search ........................................... 360/97.02

[56] References Cited

U.S. PATENT DOCUMENTS

| 5,282,101 | 2/1994 | Reinisch | 360/97.02 |
| 5,317,462 | 5/1994 | Kakizaki | 360/97.02 |

FOREIGN PATENT DOCUMENTS

| 53-1887 | 1/1978 | Japan . | |
| 59-2786 | 1/1984 | Japan . | |
| 60-9073 | 1/1985 | Japan . | |
| 2-50378 | 2/1990 | Japan | 360/97.02 |

Primary Examiner—A. J. Heinz
Attorney, Agent, or Firm—Greer, Burns & Crain, Ltd.

[57] ABSTRACT

A sealing structure for a magnetic disk drive unit having a favorable assembling workability. The sealing structure includes a base housing for receiving therein a plurality of hard disks, a spindle motor assembly for rotating the hard disks, and an actuator assembly, and having an upper surface on its outer peripheral portion, on which upper surface a plurality of projections of a predetermined height are formed; an annular packing assembly placed on the upper surface of the base housing along the projections formed on the upper surface, the annular packing assembly including a core member and a soft elastic member bonded to the core member; and a cover fixed to the base housing by crushing the packing assembly. The cover has an annular rib which is brought into abutment with the projections and the packing assembly when the cover is fixed to the base housing.

12 Claims, 8 Drawing Sheets

MAGNETIC DISK DRIVE SEALING STRUCTURE HAVING A SOFT ELASTIC MEMBER BONDED TO A CORE MEMBER

BACKGROUND OF THE INVENTION

1. Field of the Invention

This invention relates generally to a sealing structure for a magnetic disk drive unit, and particularly to a structure of a packing assembly for sealing a magnetic disk drive unit.

2. Description of the Related Art

In recent years, the tendency has progressed towards a magnetic disk drive unit as a kind of an external memory unit for a computer made smaller in size and thinner in design. Also, there is a requirement for reduced consumption of electric power for such a magnetic disk drive unit. Moreover, an increased recording density of a hard disk is required in order to fulfil the requirement for larger capacity, and therefore, the number of hard disks to be loaded on the drive unit is increased.

In the magnetic disk drive unit for a computer, a constant start and stop (CSS) system is generally employed to regulate the working relationship between a magnetic head and a hard disk. In this system, during rotation of the hard disk, the magnetic head floats on the hard disk keeping a very small distance due to the balance of force between a floating force given by an air stream generated by the hard disk rotating at a high speed and a force of the spring arm pressing the magnetic head against the hard disk. When the rotation of the hard disk is stopped, the magnetic head moves to a contactable area on the hard disk and contacts the hard disk. During the stop of rotation of the hard disk, the head and the disk are in contact with each other.

As mentioned, since the magnetic head floats on the hard disk keeping a very small distance during rotation of the hard disk, head crash, etc. tend to occur caused by tiny dust or the like. To avoid this, the hard disks and the magnetic heads for writing and reading data to and from the hard disks are arranged in a sealed chamber defined within a disk enclosure (housing). The housing of the magnetic disk drive unit comprises a base housing, and a cover secured to the base housing by screws. For sealing the housing, an annular packing made of rubber material is interposed between the base housing and the cover and then the cover is secured to the base housing.

In a large-sized magnetic disk drive units of five inches or more, an annular groove is formed in the periphery of the base housing or in the periphery of the cover, the packing is inserted in this annular groove, and then the cover is secured to the base housing by screws. However, in a magnetic disk drive unit of 3.5 (three point five) or less inches, it is practically impossible to employ this mounting method of packing because it usually does not have a sufficient width for forming a groove in the mating (or abutting) surface of the base housing or the cover.

To overcome this problem, in the conventional magnetic disk drive units of 3.5 (three point five) or less inches, an annular packing made of soft rubber material is attached to the base housing by a pressure sensitive adhesive double coated tape and thereafter, the cover is screwed tight to the base housing. The reason why a pressure sensitive adhesive double coated tape is used for attaching the annular packing to the base housing is that the annular packing lacks rigidity due to its material of soft rubber, and therefore, if the pressure sensitive adhesive double coated tape is not used, the annular packing is difficult to attach to a predetermined location of the base housing in a stable fashion.

However, in the conventional method for using a pressure sensitive adhesive double coated tape to attach the annular packing to the base housing, the following problems occur during the time the magnetic disk drive unit is repaired. That is, it is necessary to remove the cover from the base housing when the magnetic disk drive unit is to be repaired. Since the annular packing is attached to the base housing and the cover by the pressure sensitive adhesive double coated tape, when the cover is removed from the base housing, residue of the pressure sensitive adhesive double coated tape adheres to the base housing and/or the cover. For reassembling the magnetic disk drive unit after the completion of repair, it is necessary to scrape off the residue of the tape before a new annular packing is attached. This takes time and labor to scrape off the residue.

SUMMARY OF THE INVENTION

It is, therefore, an object of the present invention to provide a sealing structure for a magnetic disk drive unit which is excellent in workability at the time the unit is assembled.

In accordance with an aspect of the present invention, there is provided a sealing structure for a magnetic disk drive unit including at least one hard disk, a spindle motor assembly for rotating the hard disk, and an actuator assembly for writing/reading information to and from the hard disk, the sealing structure for a magnetic disk drive unit comprising a base housing for receiving therein the hard disk, the spindle motor assembly and the actuator assembly, and having an upper surface on an outer peripheral portion thereof, on which upper surface a plurality of projections of a predetermined height are formed; an annular packing assembly placed on the upper surface of the base housing along the plurality of projections formed on the upper surface, the annular packing assembly including a core member and a soft elastic member bonded to the core member; and a cover fixed to the base housing by crushing the packing assembly, the cover having an annular rib which is brought into abutment with the projections and the packing assembly when the cover is fixed to the base housing.

Preferably, a synthetic resin, such as polyester, polyimide or the like, is used as the core member, and a polyurethane sponge, a neoprene sponge or the like is used as the soft elastic member.

By forming the annular packing assembly of a soft elastic member such as a soft foam material to the core member which is made of synthetic resin, the rigidity of the packing assembly is enhanced and as a result, the packing assembly can be placed at a predetermined position on the base housing in a stable fashion. The position of the packing assembly on the base housing is established by coinciding the configuration of the packing assembly with the plurality of projections which are formed on the upper surface of the base housing in order to determine a crushing amount of the packing assembly, and as a result, the packing assembly is hardly displaced from the predetermined position.

By attaching the cover onto the base housing by screws, the housing can be sealed without sacrificing workability. When the cover is removed from the base housing in order to repair the magnetic disk drive unit, the residue of the packing is prevented from being adhereing to the base housing and/or the cover as conventionally experienced.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
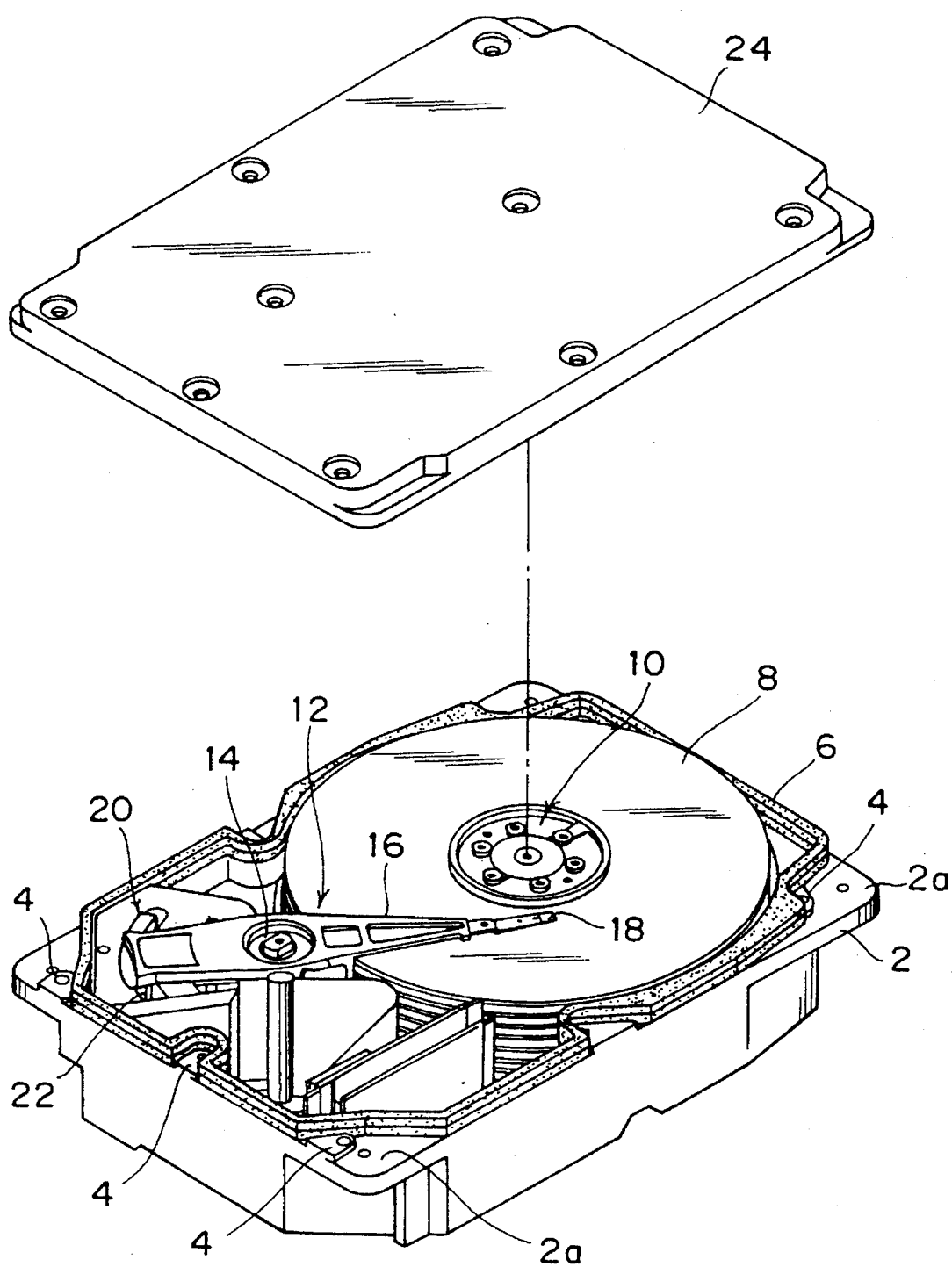
FIG. 1 is a perspective view of a magnetic disk drive unit from which a cover is removed.
Figure 2:
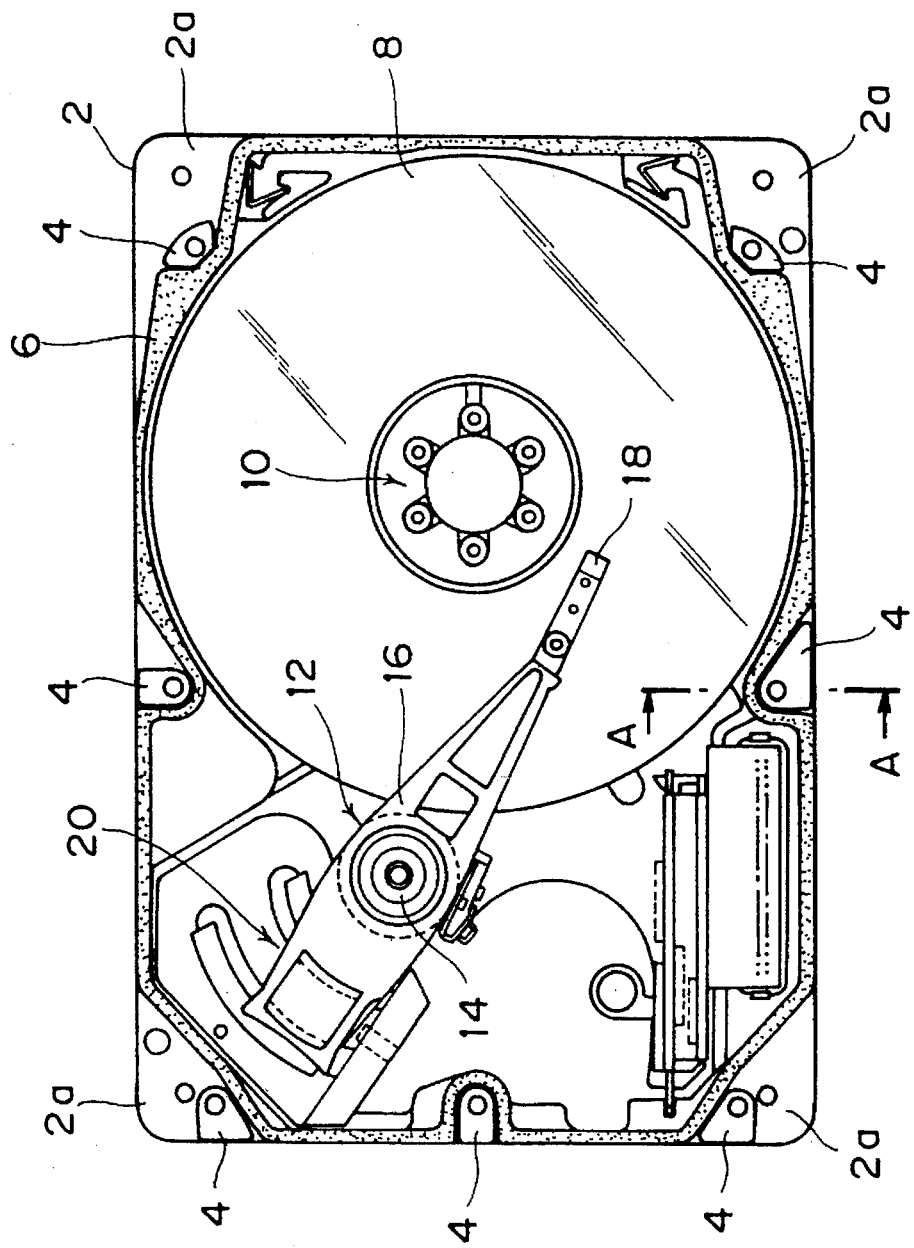
FIG. 2 is a plan view of the magnetic disk drive unit from which the cover is removed.
Figure 3:
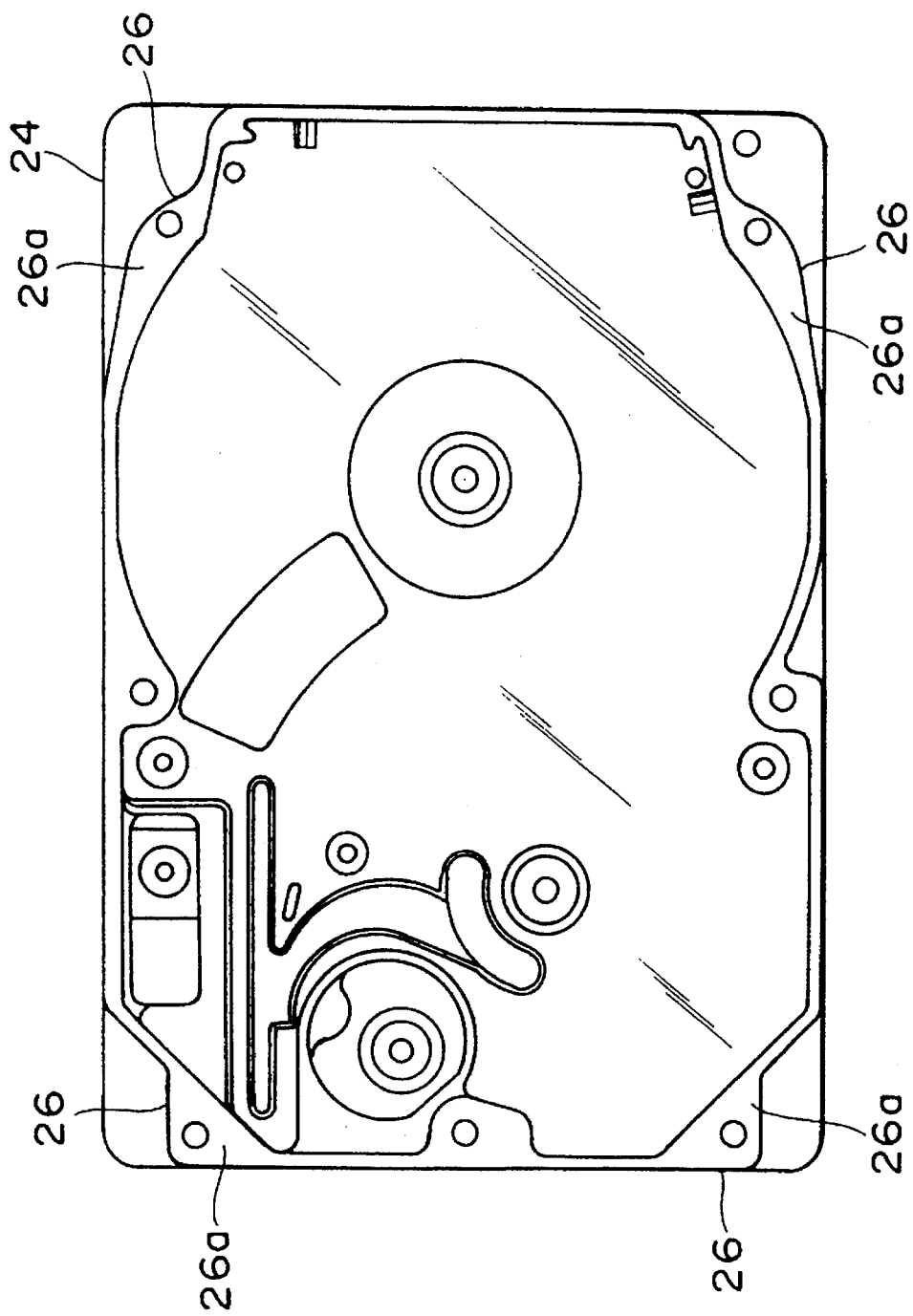
FIG. 3 is a rear view of the cover.
Figure 4:
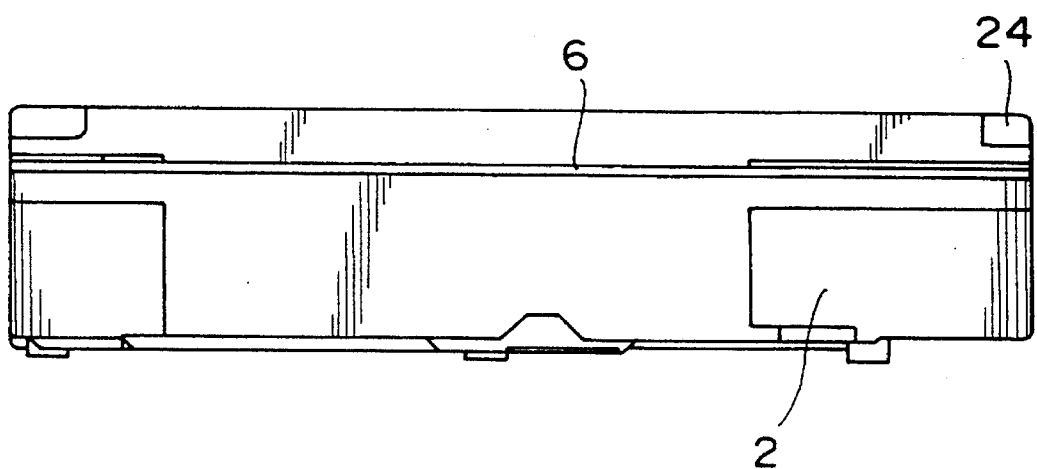
FIG. 4 is a side view of the magnetic disk drive unit.
Figure 5:
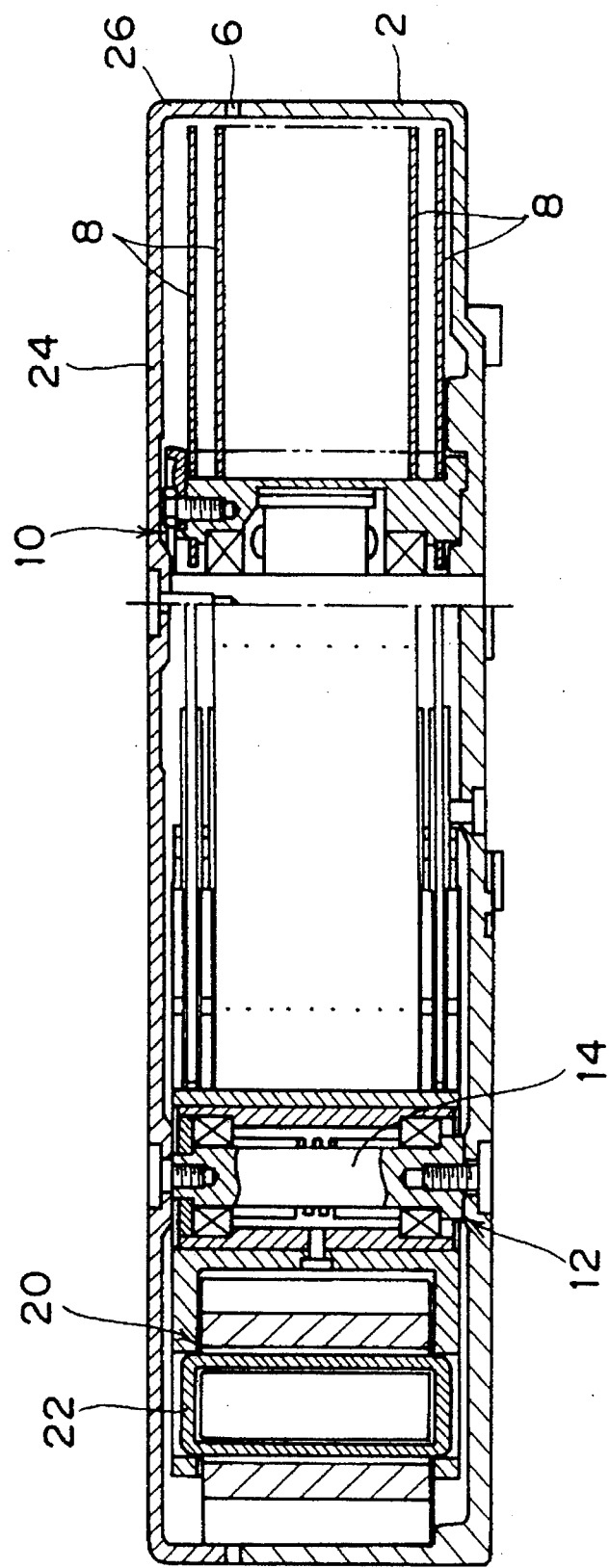
FIG. 5 is a sectional view of the magnetic disk drive unit.

Several embodiments of the present invention will be described in detail with reference to the accompanying drawings. Referring first to FIGS. 1 to 5, an outline of a magnetic disk drive unit, in which a sealing structure of the present invention is employed, will be described. Referring mainly to FIGS. 1 and 2, reference numeral 2 denotes a base housing of the magnetic disk drive unit. On an upper surface 2a of the base housing 2 at an outer peripheral portion thereof, a plurality of projections 4 for determining a crushing amount of an annular packing assembly or seal assembly 6 are formed. The packing assembly 6 has a configuration coinciding with the projections 4 which are formed on the upper surface 2a of the base housing 2. A placing position of the packing assembly 6 on the base housing 2 is established by the projections 4, so that the packing assembly will be prevented from being displaced.

A plurality of hard disks 8 are rotatably received in the base housing 2. These hard disks 8 are rotated by a spindle motor assembly 10. Reference numeral 12 denotes an actuator assembly which is rotatably mounted on a pivot shaft 14. A transducer or magnetic disk head 18 for writing/reading information to and from the hard disks 8 are attached to one end of an actuator arm 16. The other end of the actuator arm 16 is operatively connected to a voice coil motor 20. By supplying electric current to a coil 22 of the voice coil motor 20, the actuator arm 16 is pivoted about the pivot shaft 14.

Reference numeral 24 denotes a cover which is firmly secured to the base housing 2 by screws. As will be apparent from FIGS. 3 and 5, an annular rib 26 is integrally formed on an outer peripheral portion of the cover 24 at a rear surface thereof. The annular rib 26 has a lower surface 26a which is brought into abutment with the projections 4 formed on the base housing 2 when the cover 24 is secured to the base housing 2. As will be apparent from FIGS. 4 and 5, the cover 24 is secured to the base housing 2 by screws with the annular packing assembly 6 sandwiched therebetween and defines a sealed chamber within the base housing 2. The above-mentioned hard disks 8, spindle motor assembly 10, actuator assembly 12, etc. are received in this sealed chamber.

Figure 6:
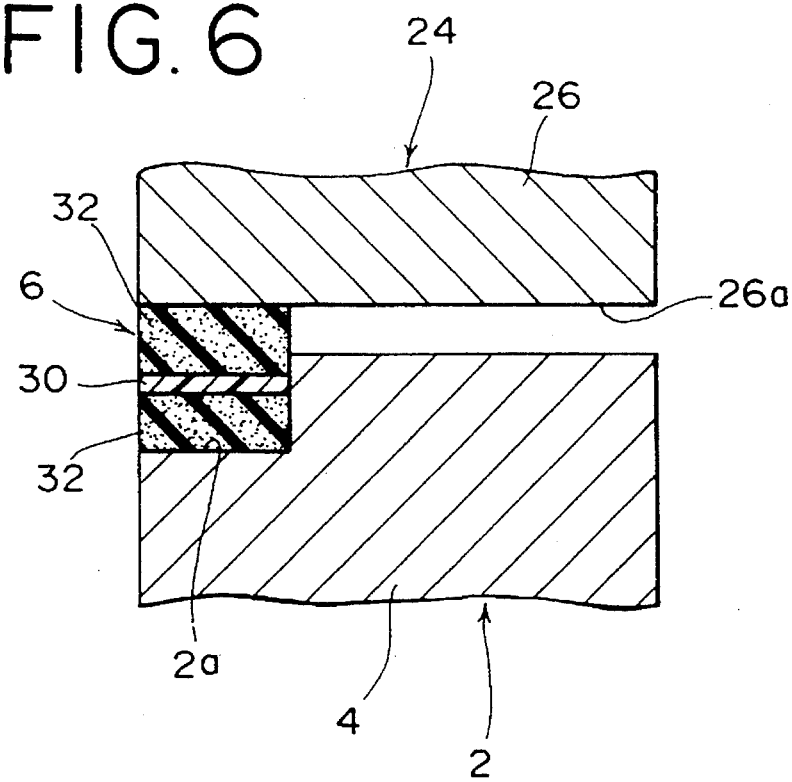
FIG. 6 is an enlarged sectional view taken on line A—A of FIG. 2 showing a first embodiment of the present invention before the cover is attached to a base housing.
Figure 7:
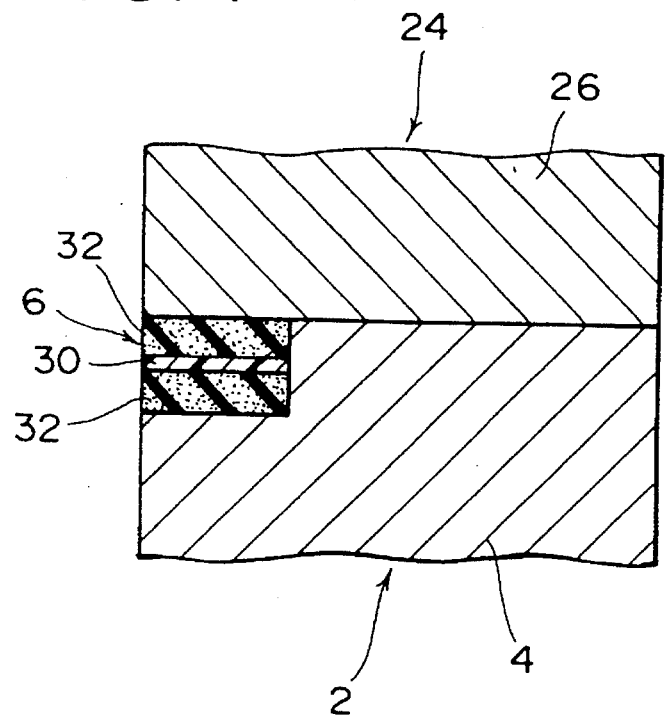
FIG. 7 is an enlarged sectional view taken on line A—A of FIG. 2 showing the first embodiment of the present invention, with the cover attached to the base housing.

Referring next to FIGS. 6 and 7, there are illustrated enlarged sectional views taken on line A—A of FIG. 2, showing, respectively, a state before the cover is attached to the base housing and a state after the cover is attached to the base housing. The packing assembly 6 is constituted by bonding soft elastic member such as a foam material 32 to both surfaces of a core member 30 which is made of synthetic resin such as polyester or polyamide. The employment of polyester as the core member 30 makes it possible to reduce the cost of material without any sacrifice of rigidity of the packing assembly 6.

Also, the employment of polyimide as the core member 30 makes it possible to design the core member 30 thinner while ensuring a sufficient degree of rigidity. This is advantageous for designing particularly in the case where the thickness of the packing assembly 6 is limited. As for the foam material 32, polyurethane sponge, neoprene sponge, etc. can be used. By pouring the foam material 32 into a mold in which the core member 30 is placed and allowing the foam material to be foamed, the foam material 32 is adhered to both surfaces of the core member 30. Alternatively, it may be designed such that the core member 30 and the foam material 32 are molded separately and the foam material 32 is bonded to the core member 30 using adhesive agent or a pressure sensitive adhesive double coated tape.

As is shown in FIG. 6, the height of the packing assembly 6 is formed higher than that of the projections 4 in a free state. As is shown in FIG. 7, when the cover 24 is secured to the base housing 2 by screws, the packing assembly 6 is crushed until the lower surface of the rib 26 formed on the outer peripheral portion of the cover 24 is brought into abutment with the upper surfaces of the projections 4, thereby sealing the housing.

Since the packing assembly 6 of this embodiment is formed by adhering the foam materials 32 to both surfaces of the core member 30, the rigidity of the packing assembly 6 is enhanced and the packing assembly 6 can be placed in a predetermined position on the base housing 2 in a stable fashion. The placing position of the packing member 6 on the base housing 2 is determined by coinciding the configuration of the packing assembly 6 with the projections 4 formed on the base housing 2 and the displacement of the placing position of the packing assembly 6 can be prevented by the projections 4.

Figure 8:
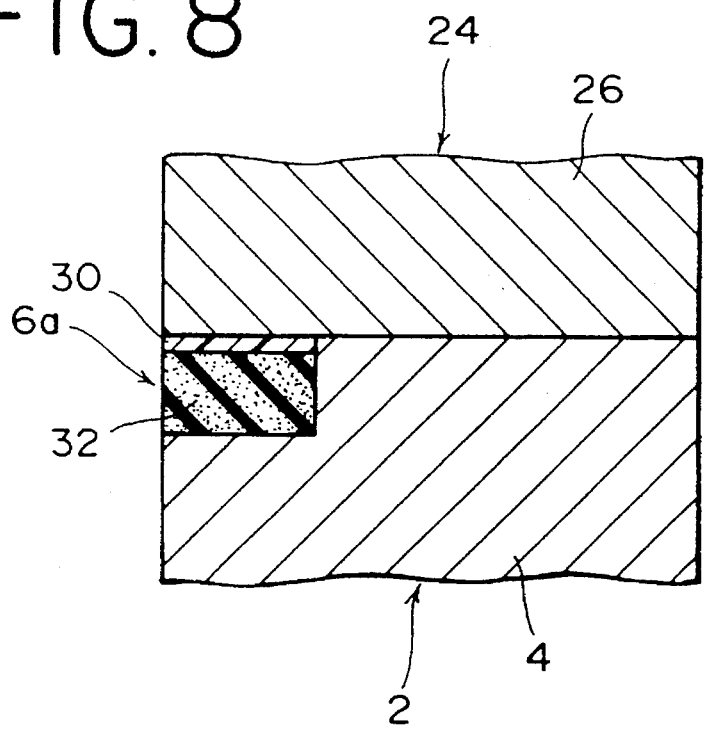
FIG. 8 is an enlarged sectional view taken on line A—A of FIG. 2 showing a second embodiment of the present invention.

Referring now to FIG. 8, an annular packing assembly 6a according to a second embodiment of the present invention is shown. This packing assembly 6a is constructed by lining a single side of the core member 30 with the foam material 32. A lower cost for the packing assembly 6a can be achieved when compared with the afore-mentioned first embodiment. It should be noted that in the case of this embodiment, the lower surface 26a of the rib 26, which is brought into abutment with the core member 30, is needed to be machined so that the lower surface 26a may have a favorable degree of precision.

Figure 9:
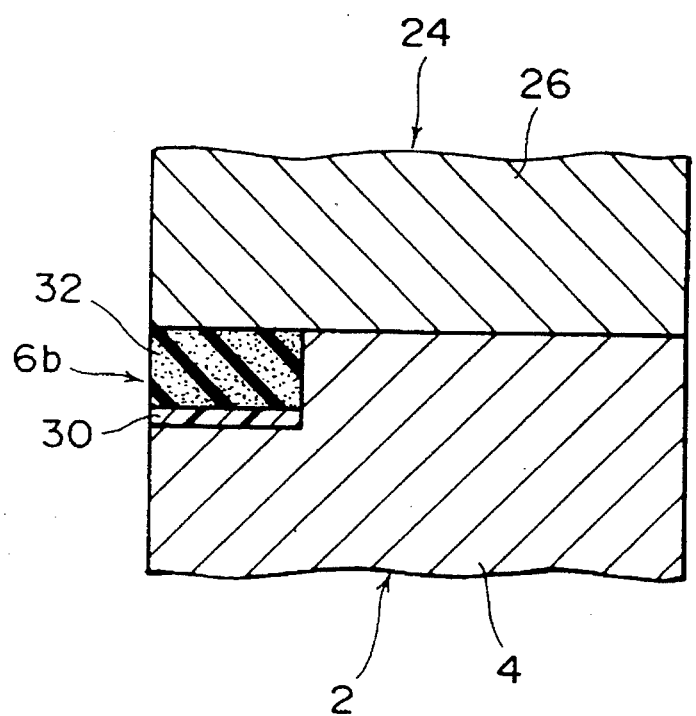
FIG. 9 is an enlarged sectional view taken on line A—A of FIG. 2 showing a third embodiment of the present invention.

Referring to FIG. 9, a packing assembly 6b according to a third embodiment of the present invention is shown. The packing assembly 6b of this embodiment is formed, as in the case with the packing assembly 6a of the second embodiment mentioned above, by lining a single side of the core member 30 with the foam material 32. The packing assembly 6b is placed on the base housing 2 so that the core member 30 is abutted with the upper surface 2a of the base housing 2. In the case of this embodiment, it is necessary to machine the upper surface 2a of the base housing 2, which upper surface 2a is to be abutted with the core member 30, with a favorable degree of precision in order to maintain the sealing function. Since the core member 30 is restricted by the projections 4 in this embodiment, the packing assembly 6b can be placed on the base housing 2 in a more stable fashion.

Figure 10:
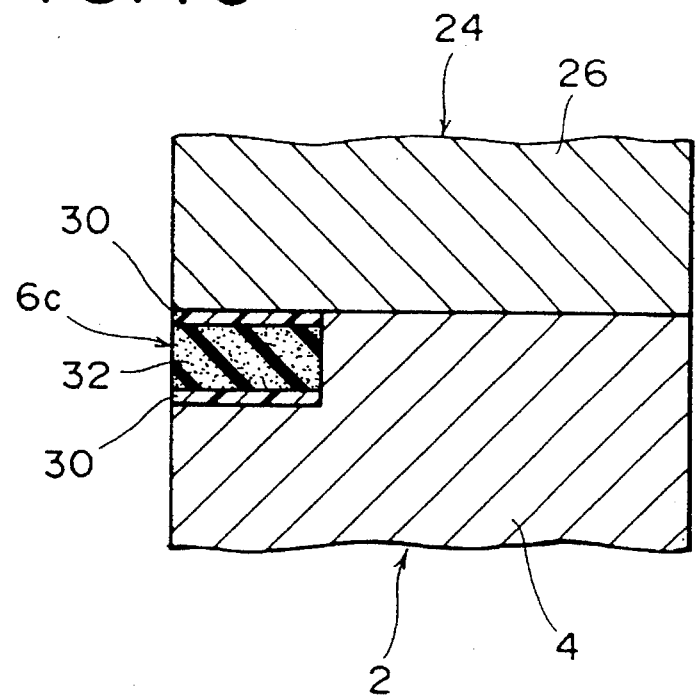
FIG. 10 is an enlarged sectional view of FIG. 2 showing a fourth embodiment of the present invention.

Referring to FIG. 10, a packing assembly 6c of a fourth embodiment of the present invention is shown. The packing assembly 6c of this embodiment is formed by lining both sides of the foam material 32 with the core members 30. In the case with this embodiment, it is necessary to machine the upper surface 2a of the base housing 2 and the lower surface 26a of the rib 26 with a favorable degree of precision in order to maintain the sealing function. Since two core members 30 are used, even if comparatively soft core members are used, the rigidity of the packing assembly 6c can be enhanced (i.e., the rigidity is not sacrificed).

Figure 11:
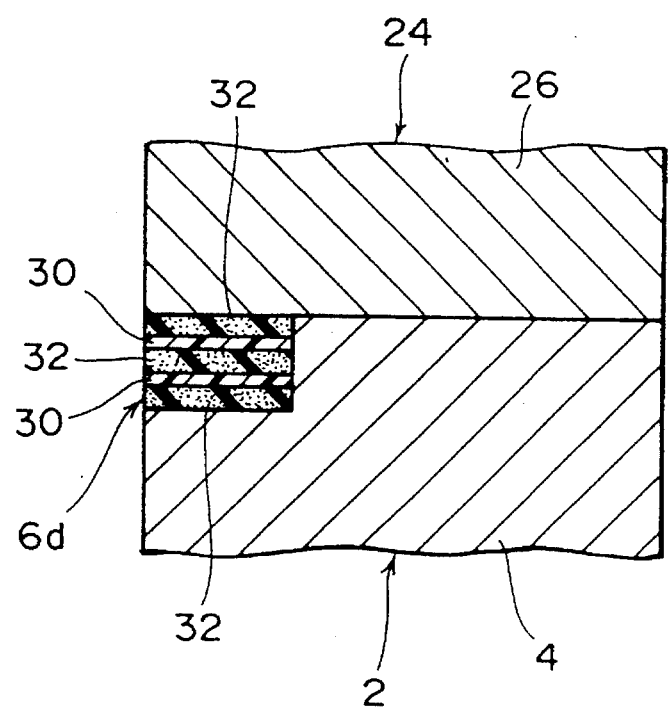
FIG. 11 is an enlarged sectional view taken on line A—A of FIG. 2 showing a fifth embodiment of the present invention.

Referring to FIG. 11, a packing assembly 6d of a fifth embodiment of the present invention is shown. The packing assembly 6d of this embodiment is formed by sandwiching a plurality of core members 30 each between adjacent ones of a plurality of foam materials 32. As in the case with the fourth embodiment of FIG. 10, the rigidity of the packing assembly 6d can be enhanced while the degree of precision of the upper surface 2a of the base housing 2 and the lower surface 26a of the rib 26 may be rough.

According to the present invention, a technical effect is exhibited in that a sealing structure for a magnetic disk drive unit having a favorable workability of assembly can be provided.

What is claimed is:

1. A sealing structure for a magnetic disk drive unit including at least one hard disk, a spindle motor assembly for rotating said hard disk, and an actuator assembly for writing/reading information to and from said hard disk, said sealing structure for a magnetic disk drive unit comprising:

a base housing for receiving therein said hard disk, said spindle motor assembly and said actuator assembly, said base housing having a upper surface on an outer peripheral portion thereof, on which upper surface a plurality of projections of a predetermined height are formed;

an annular packing assembly placed on said upper surface of said base housing along said plurality of projections formed on said upper surface, said annular packing assembly including a single core member and a single soft elastic member bonded to a single surface of said core member; and a cover fixed to said base housing by crushing said packing assembly, said cover having an annular rib which is brought into abutment with said projections and said packing assembly when said cover is fixed to said base housing.

2. A sealing structure for a magnetic disk drive unit as defined in claim 1, wherein said annular rib has a lower surface of a favorable degree of precision, said annular packing assembly comprises said core member and said soft elastic member bonded to a single surface of said core member, and said core member is brought into abutment with the lower surface of said annular rib.

3. A sealing structure for a magnetic disk drive unit as defined in claim 1, wherein the upper surface of said base housing has a favorable degree of precision, said annular packing assembly comprises said core member and said soft elastic member bonded to a single surface of said core member, and said core member is brought into abutment with the upper surface of said base housing.

4. A sealing structure for a magnetic disk drive unit as defined in claim 1, wherein said annular rib has a lower surface of a favorable degree of precision, the upper surface of said base housing has a favorable degree of precision, said annular packing assembly comprises a pair of said core members and said soft elastic member sandwiched between said core members, and said core members are brought into abutment with the lower surface of said annular rib and the upper surface of said base housing, respectively.

5. A sealing structure for a magnetic disk drive unit as defined in claim 1, wherein said core member is formed of a synthetic resin, and said soft elastic member is formed of a polyurethane sponge.

6. A sealing structure for a magnetic disk drive unit as defined in claim 1, wherein said core member is formed of a synthetic resin, and said soft elastic member is formed of a neoprene sponge.

7. A sealing structure for a magnetic disk drive unit including at least one hard disk, a spindle motor assembly for rotating said hard disk, and an actuator assembly for writing/reading information to and from said hard disk, said sealing structure for a magnetic disk drive unit comprising:

a base housing for receiving therein said hard disk, said spindle motor assembly and said actuator assembly, said base housing having an upper surface on an outer peripheral portion thereof, on which upper surface a plurality of projections of a predetermined height are formed;

an annular packing assembly placed on said upper surface of said base housing along said plurality of projections formed on said upper surface, said annular packing assembly including a plurality of soft elastic members and a plurality of core members, said core members being sandwiched between and bonded to adjacent ones of said elastic members; and a cover fixed to said base housing by crushing said packing assembly, said cover having an annular rib which is brought into abutment with said projections and said packing assembly when said cover is fixed to said base housing.

8. A sealing structure for a magnetic disk drive unit as defined in claim 7, wherein said core members are formed of a synthetic resin, and said soft elastic members are formed of a polyurethane sponge.

9. A sealing structure for a magnetic disk drive unit as defined in claim 7, wherein said core members are formed of a synthetic resin, and said soft elastic members are formed of a neoprene sponge.

10. A sealing structure for a magnetic disk drive unit including at least one hard disk, a spindle motor assembly for rotating said hard disk, and an actuator assembly for writing/reading information to and from said hard disk, said sealing structure for a magnetic disk drive unit comprising:

a base housing for receiving therein said hard disk, said spindle motor assembly and said actuator assembly, said base housing having an upper surface on an outer peripheral portion thereof, on which upper surface a plurality of projections of a predetermined height are formed, said upper surface having a favorable degree of precision;

an annular packing assembly placed on said upper surface of said base housing along said plurality of projections formed on said upper surface, said annular packing assembly including a pair of core members and a soft elastic member bonded to and sandwiched between said core members; and a cover fixed to said base housing by crushing said packing assembly, said cover having an annular rib which is brought into abutment with said projections and said packing assembly when said cover is fixed to said base housing, said annular rib having a lower surface of a favorable degree of precision.

11. A sealing structure for a magnetic disk drive unit as defined in claim 10, wherein said core members are formed of a synthetic resin, and said soft elastic member is formed of a polyurethane sponge.

12. A sealing structure for a magnetic disk drive unit as defined in claim 10, wherein said core members are formed of a synthetic resin, and said soft elastic member is formed of a neoprene sponge.

* * * * *